United States Patent
Gilbert

[15] 3,678,495
[45] July 18, 1972

[54] TARGET INDICATING SYSTEM AND METHOD

[72] Inventor: Roswell W. Gilbert, New York, N.Y.
[73] Assignee: Technical Management Services, Inc., Westfield, N.J.
[22] Filed: Feb. 26, 1970
[21] Appl. No.: 14,611

[52] U.S. Cl. .................................... 340/323, 273/102.2 S
[51] Int. Cl. ............................................. G08b 27/00
[58] Field of Search ..................... 340/323; 273/102.2 S

[56] References Cited

UNITED STATES PATENTS 3,022,076  2/1962  Zito ............................... 340/323 X

*Primary Examiner*—John W. Caldwell
*Assistant Examiner*—Michael Slobasky
*Attorney*—Curtis, Morris & Safford

[57] ABSTRACT

Transducers are spaced evenly in opposed pairs around a metal target. The transducers receive acoustic waves created by bullets striking the target and produce corresponding electrical signals. The approximate "score" of the impact (the distance from the center of the target) is determined by starting a counter with the signal from the first transducer to receive an acoustic wave, and then stopping the counter with the signal from the last transducer to receive the acoustic wave. The approximate azimuth of the impact is determined by using the transducer signals and logic circuitry to light one of twelve lamps to indicate in which of 12 sectors of a circle the impact is located.

23 Claims, 6 Drawing Figures

Patented July 18, 1972
3,678,495
2 Sheets—Sheet 1
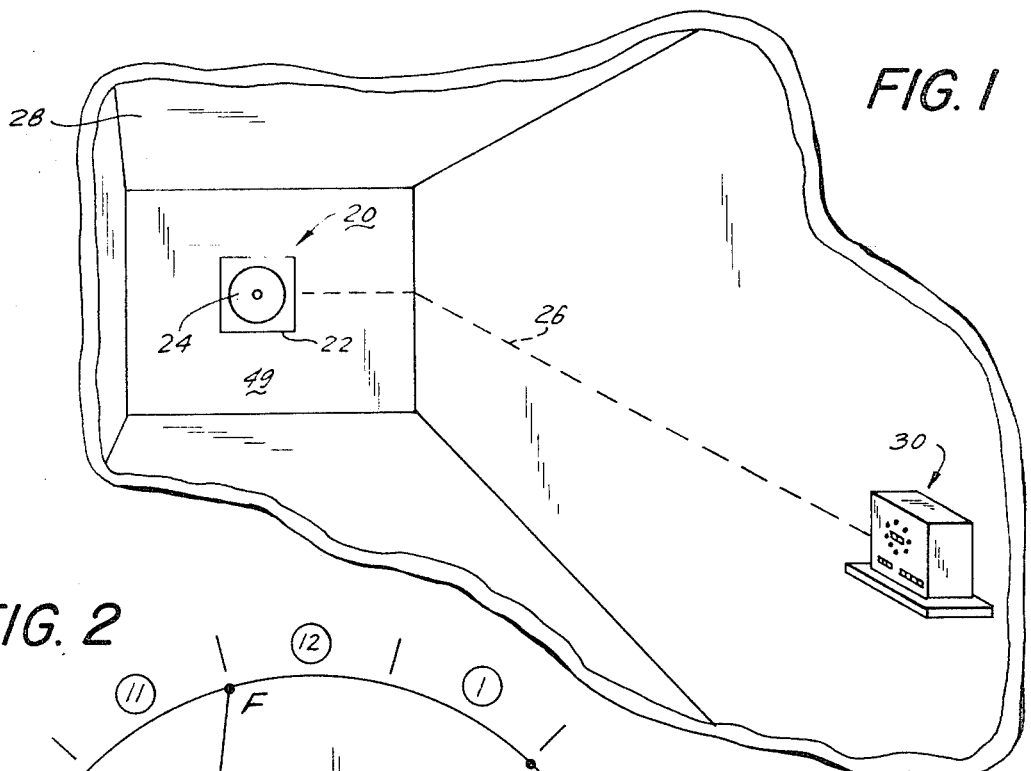
FIG. 1
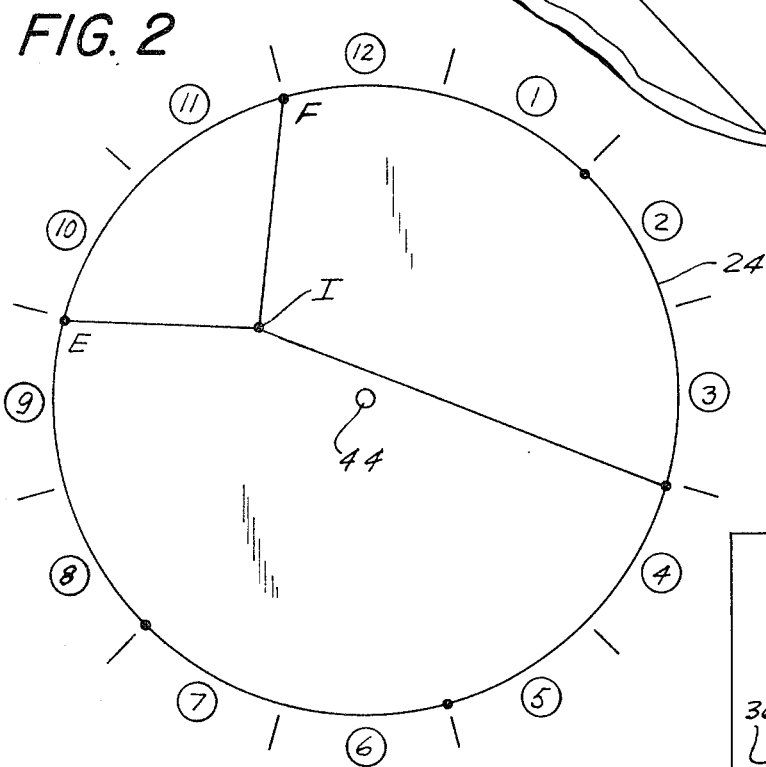
FIG. 2
FIG. 3
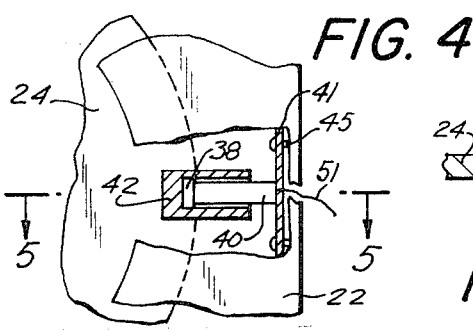
FIG. 4
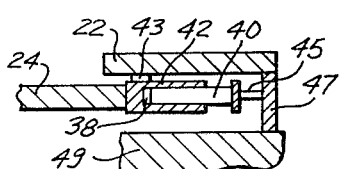
FIG. 5
INVENTOR
ROSWELL W. GILBERT
BY
Curtis, Morris + Safford
ATTORNEYS

TARGET INDICATING SYSTEM AND METHOD

This invention relates to means and methods for evaluating impacts on targets, and particularly to methods and apparatus for remotely indicating the score and location of target impacts.

Many different schemes have been proposed in the past for remotely indicating the location and score of an impact on a target. Such prior schemes include the use of segmented targets with electrical switches actuated by the impact of a bullet, and devices for electrically sensing and indicating the location of holes in a paper or fabric target. Other schemes include the timing of the travel of shock waves in a target plate, together with a servo-mechanism for remotely indicating the location of the impact on a facsimile target. Such prior approaches are not entirely satisfactory in that they are complicated and expensive, and/or the targets are permanently perforated by the shots and thus are not re-usable.

Accordingly, it is an object of the present invention to provide a target impact scoring the locating system and method which is simple and inexpensive to manufacture and use, in which the target is highly resistant to damage due to bullet impact, which operates rapidly to give a remote score and indication of impact location.

The foregoing objects are met by the provision of a target scoring system and method in which the approximate distance of an impact from a predetermined reference point on the target is determined by measuring the maximum time difference between arrivals of an acoustic wave at a plurality of measurement points located evenly around the reference point. The approximate location of the impact is determined by determining the measurement point at which the wave first arrives.

Other objects, aspects and advantages of the invention will be described in or apparent from the following description and drawings in which:

FIG. 1 is a broken-away perspective view of a preferred embodiment of the target impact evaluation system of the present invention;

FIG. 2 is a partially schematic view of a portion of the system shown in FIG. 1;

FIG. 3 is a front elevation view of another portion of the system shown in FIG. 1;

FIG. 4 is a broken-away cross-sectional view of a portion of the system shown in FIG. 1;

FIG. 5 is a cross-sectional view taken along line 5—5 of FIG. 4; and

GENERAL DESCRIPTION

Figure 6:
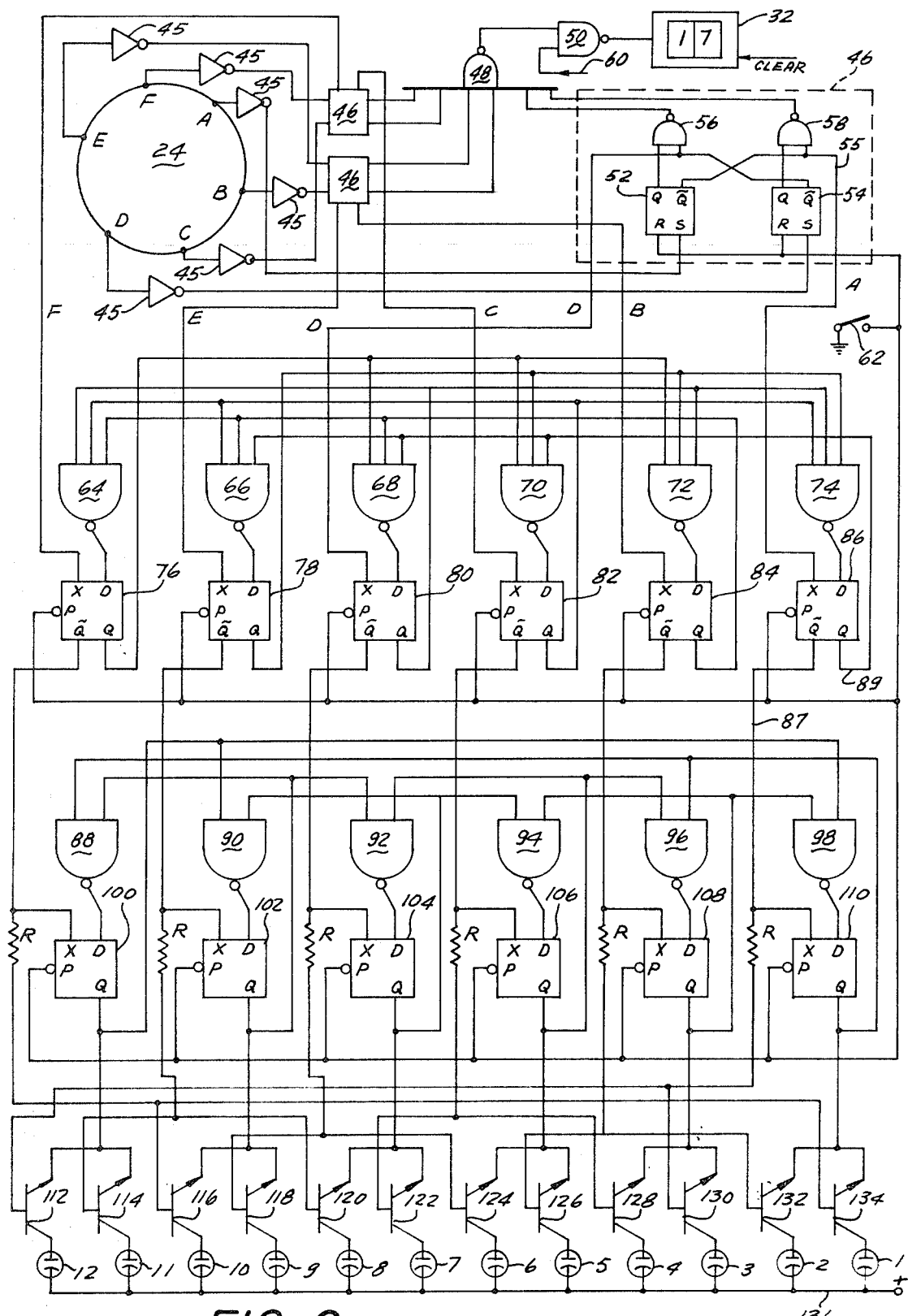
FIG. 6 is a schematic electrical circuit diagram of the system shown in FIG. 1.

FIG. 1 illustrates a target impact evaluation system, as it might be used for rifle or pistol target practice in a room 28. The system includes a scoring indicator unit 30 connected by means of a cable 26 to a target unit 20 which is mounted on the far wall 49 of the room 28.

The target unit 20 includes a circular steel target plate 24 and a metal guard plate 22. The guard plate 22 has a circular opening which defines a circular target area.

Referring to FIG. 3, the remote scoring unit 30 includes a counter 32 which indicates a number which represents the approximate distance of the bullet impact from the center 44 of the target plate 24. Thus, counter 32 indicates the "score" of the impact. Twelve lamps numbered 1 through 12 are arranged in a circular array in the manner of the hour numbers on a clock face in order to indicate the approximate azimuth of the impact. Thus, the unit 30 indicates both the approximate distance of the impact from the center of the target, and the sector of the target in which the impact is located. The unit 30 is shown mounted on the wall of the room 38 in a remote location near the shooter, but it can be located in any other convenient place as desired.

Still referring to FIG. 3, another indicator lamp entitled "MISS" is provided to indicate when a shot completely misses the target area. Another counter 36 is provided to indicate the number of the particular round which has just been shot, and still another counter 34 indicates the total score of the rounds which have been shot. A "CLEAR" button is provided to clear and reset the counters 32, 34 and 36 to zero, and a "RESET" button is provided in order to reset the azimuth and miss indicator lamps. Of course, the reset and clear functions can be provided automatically, and the score and azimuth indications can be printed out or otherwise recorded in sequence so that an accurate evaluation record of a rapid series of shots can be provided.

SCORING

FIG. 2 illustrates schematically the preferred method by means of which the score of an impact is computed. Six identical transducers, shown schematically as six points A, B, C, D, E and F, are spaced at 60° intervals around the edge of the target plate 24. Each of the transducer locations is midway between two adjacent hour indicator points. Thus, the transducers are located equidistant from the center 44 of the target 24, and are arranged in opposed pairs; that is, transducer A is opposite transducer D, transducer F is opposite transducer C, and transducer E is opposite transducer B.

As will be explained in greater detail below, each of the transducers is mounted and adapted to detect a compressional acoustic wave which is developed in the steel target plate 24 due to an impact of a bullet or other projectile against the target plate. The score of the impact is computed simply by using the electrical signal produced by the first transducer to receive the acoustical wave to connect the counter 32 to a clock pulse source, and then using the signal produced by the last transducer to receive the wave to disconnect the counter from the clock pulse source. The frequency of the clock source is set at a value such that the indication of the counter 32 will be approximately proportional to the distance of the impact from the center 44 of the target.

It can be shown that the time difference between the first and last arrivals of the acoustic wave at any of the transducers A through F is directly proportional to the distance of the impact point from the center 44 of the plate 24, if the impact point is on a direct line between two opposed transducers. The following equation expresses this relationship mathematically:

$$[1] \quad t_2 - t_1 = 2r/V$$

where:

$t_1$ = first arrival time of the acoustic wave at any transducer
$t_2$ = last arrival time of the acoustic wave at any transducer
$r$ = distance of the impact point from the center 44 of target 24.
$V$ = the velocity of sound in the target material.

Moreover, applicant has recognized that even if the impact point is not located directly on a line between two proposed transducers, the error in the score is not large. Of course, the amount of this error varies with the number of transducer pairs used, and with the distance of the impact from the center of the target. The maximum error in scoring shots reasonably close to the center of the target is insignificant, and the maximum error near the outer edges of the target area can be minimized by extending the inner edge of the guard plate 22 inwardly towards the center of the target and thus reducing the ratio of the diameter of the target area to the diameter of the whole target plate 24.

Applicant also has observed that with the transducers arranged symmetrically as shown in FIG. 2, the transducer which is closest to the impact point always will receive the acoustic wave first, and the transducer opposite to that transducer always will receive the wave last. This is because the wave travels in a circular front of rapidly increasing radius from the point of impact. Thus, in the specific example of the impact point I shown in FIG. 2, the transducer E is closest to the impact point and thus will produce an electrical signal first, whereas the opposite transducer B will produce a signal last, since it receives the acoustic wave last among all of the transducers.

The foregoing scoring apparatus and method have the advantage of being very fast. The equipment needed to implement this feature of the invention is relatively simple and inexpensive, as will be explained in greater detail below.

LOCATING THE IMPACT

The approximate location of the impact can be indicated roughly by simply lighting an indicator lamp corresponding to the first transducer to receive the acoustic wave, and then disabling all of the other lamps. However, since there are only six transducers, this will locate the impact only within a 60° (2-hour) sector of the circular target. It is more customary to locate the impact within 30°, i.e., within one of the twelve hour sectors. Such indication can be provided, in accordance with the present invention, simply by using twelve transducers instead of six, and locating each of the transducers at one of the hour points 1 through 12. Then, the first transducer to receive the acoustic wave is used to light a corresponding indicator lamp, and all of the other transducers simultaneously are disabled so that only one indicator lamp is lighted, and the azimuth of the impact has been indicated.

The preferred location method uses only the six transducers A through F which are used for scoring a hit. As has been noted above, the identification of the first transducer to receive an acoustic wave locates the impact within a 60° sector of the target. In accordance with the present invention, the impact is located in either the clockwise or counter-clockwise half of that 60° sector by detecting which of the transducers is the second one to receive the acoustic wave. If the second transducer is clockwise from the first, the indicator lamp clockwise from the first transducer is lighted. If the second transducer is counterclockwise from the first, the indicator lamp counterclockwise from the first transducer is lighted. For example, in FIG. 2 transducer E is the first to be hit by the acoustic wave, and transducer F is the second. This locates the impact in the 10 o'clock sector, and the indicator lamp 10 is lighted.

SCORING LOGIC

FIG. 6 illustrates in schematic form the electrical logic circuitry which is used to perform the scoring and locating functions described above.

As is shown at the top of FIG. 6, each of the transducers A through F develops an electrical signal which is amplified by an inverting amplifier 45 and is conducted to one of three identical gating circuits 46. Each transducer of each opposed transducer pair is connected to a separate one of the gating circuits 46; that is, transducers A and D are connected to the gating circuit 46 in the upper right hand corner of FIG. 6; transducers F and C are connected to one of the other circuits 46, and transducers E and B are connected to the other of the gating circuits 46.

Each gating circuit 46 includes two R-S type flip-flops 52 and 54 which are used as "latches." Normally, when the transducers do not detect any acoustic waves, the signals from amplifiers 45 is "high" (a digital "1"). The amplifiers 45 deliver "0" (negative-going) signals to the "set" ("S") leads of the flip-flops. The output leads from the flip-flops are connected in the manner shown to two NAND gates 56 and 58 whose outputs are connected to two input leads of a six-input NAND gate 48. The output from NAND gate 48 is delivered to a two-input NAND gate 50 which also receives a high-frequency clock signal from a clock source (not shown) over an input lead 60. The output from the NAND gate 50 is delivered to the counter 32. The output signals from the other two gating circuits 46 are conducted to the other four input leads of the NAND gate 48. A reset signal for the flip-flops 52 and 54 is provided by means of a switch 62 which connects the "reset" ("R" leads of the flip-flops to ground and thus delivers a "0" reset signal.

In the initial or reset condition, the Q leads of the flip-flops have a "1" and the $\overline{Q}$ leads have a "0" signal on them. Thus, one of the input leads to each of the NAND gates 56 and 58 has on it a digital "1" signal (it is "high"), and the other lead has a digital "0" signal on it (it is "low"). Therefore, the output signal from each NAND gate 56 and 58 is high, and all of the inputs to the NAND gate 48 are high, and the output from gate 48 is low. Thus, the counter 32 will have a steady input signal despite the fluctuations of the clock signals supplied on lead 60, and will not count. The NAND gate 48 actually is used as a "NOR" gate in that when any of its six input leads is low, its output switches from low to high and switches NAND gate 50 into conduction so that counter 32 starts counting clock pulses.

Each time one of the transducers A through F receives an acoustic wave, it delivers zero signal to one of the flip-flops 52 or 54 and switches one of the NAND gates 56 or 58 from its initial condition in which its output is low, thus enabling the counter 32. For example, if transducer A is the first to receive the acoustic wave, it sends a zero signal to the flip-flop 52. This changes the right-hand input lead of gate 58 from low to high. Since the left-hand lead of gate 58 already is high because of its connection to the Q lead of flip-flop 54, both inputs to gate now 58 are high, and the output of gate 58 reverses, the output of gate 48 goes high, and the clock pulses are gated through to the counter.

Subsequently, each of the four transducers F, D, E, and C will be activated, and a corresponding one of the flip-flops 52 and 54 in the other gating circuits 46 will be operated. However, none of these actions affects the counting of the counter 32, which already is energized and remains so. However, when the transducer D is activated, the counter 32 is disabled. The way in which this happens is that transducer D delivers a signal to the flip-flop 54 which switches its state. This switches the left-hand input lead to gate 58 from high to low, thus switching the output of gate 58 from low to high. In the meantime, all of the other gates 56 and 58 have switched to a high output signal condition, since each of the other transducer pairs F and C, and E and B have been actuated. Thus, all of the inputs to the gate 48 again are high so that the output of gate 48 switches to low and the counter 32 is disabled again. Operation of the reset switch 62 returns each of the flip-flops 52 and 54 to its initial or reset condition and prepares the circuit for another target impact.

In the foregoing circuit, counter 32 is activated by the first transducer to receive an acoustic wave, and is disabled by the last transducer to receive the wave. Therefore, the counter 32 counts and indicates the approximate score of the impact, in the manner described above.

The preferred target plate 24 is made of one quarter inch-thick tool steel with a hard chrome surface or stainless tool steel to prevent bullets from adhering to the target. The approximate speed of sound in such steel is 5,000 meters per second. The frequency of the clock source signal should be set to a value such that the number of pulses counted by the counter 32 during the counting interval will correspond to a given distance from the center 44 of the target 24. In the preferred embodiment of the invention shown in the drawings, the counter 32 is capable of counting to 99. The counter starts at zero and counts up to a number proportional to the distance of the impact from the center of the target. Of course, a count-down counter can be used instead which will count down from 100 and thus give a score near 100 for a bull's eye and a score near zero for an impact at the edge of the target. For the target 24 described above having a total diameter of 6 inches and a target area diameter of 5 inches, with six transducers located as mentioned above, a clock source frequency of 4.8 megacycles has proved satisfactory for scoring from zero to 100.

The "MISS" indicator merely is a lamp which lights when the counter 32 is full, thus indicating a hit out of the target area.

AZIMUTH LOGIC

The azimuth logic circuit comprises the lower portion of the circuit shown in FIG. 6. This circuit includes two rows of "D"-type flip-flops. Connected to the "D" input lead of each of the first row flip-flops 76, 78, 80, 82, 84 and 86 is the output of a three-input NAND gate. Similarly, a two-input NAND gate is connected to the "D" input of each flip-flop 88, 90, 92, 94, 96 and 98. The NAND gates are used to selectively inhibit the flip-flops. Twelve transistors 112 through 134 are connected between the flip-flops and the lamps 1 through 12 to complete the logic circuitry. The lamps are supplied with positive voltage from a lead 136. In the reset or starting condition, all of the transistors and lamps are turned off.

In the initial reset condition, a "1" appears on each Q lead, and a "0" on each $\overline{Q}$ lead of each flip-flop. The $\overline{Q}$ leads of the first-row flip-flops are connected to the base leads of the transistors 112–134, in a selected pattern, to provide forward bias for those selected transistors when the first-row flip-flop is switched. Similarly, the Q output lead of each flip-flop in the second row is connected to the emitters of selected ones of the transistors 112–134. When there is a "0" on the Q lead of a second-row flip-flop, it is connected to ground. Thus, the appearance of a "0" on the second-row flip-flop Q lead grounds the emitters of the transistors to which the Q lead is connected. The coincidence of a forward bias signal corresponding to a "1" on a first-row flip-flop Q lead and a ground path corresponding to a "0" on a second-row flip-flop Q lead must occur before a given transistor will turn on and its associated lamp will light.

The "X" or "clock" input lead of each flip-flop in the first row is connected to one of the gating circuits 46 so that it receives a "1" switching pulse when one of the transducers delivers an output signal. For example, the input lead to flip-flop 86 is connected by means of a lead 55 to the $\overline{Q}$ output lead of flip-flop 52 which is operated by transducer A. Actuation of any flip-flop in the first row results in actuation of the flip-flop immediately below it in the second row, unless the latter flip-flop has been inhibited. That is, for example, the switching of flip-flop 86 results in a "1" being sent to the X input lead of flip-flop 110, thus switching the latter flip-flop.

In the reset condition, each input lead of each of the NAND gates in the first and second rows has a "1" on it, so that the output of each gate is "0." Application of a "1" to the "D" input of each flip-flop is required to inhibit the flip-flop. The Q leads of the flip-flops are connected to the inputs of the NAND gates in a pre-determined pattern, so that every time a flip-flop switches, it inhibits two or three other flip flops in order to prevent all except the correct azimuth lamp 1–12 from lighting.

To take the specific example of a one o'clock impact on the target, transducer A will be energized first and will switch flip-flops 86 and 110. The switching of flip-flop 110 will connect the emitter of transistor 134 to ground. Also, gates 66, 68 and 70 have been switched by the appearance of a "0" on lead 89 of flip-flop 86, thus inhibiting flip-flops 78, 80 and 82. Similarly, the switching of flip-flop 110 inhibits flip-flops 100 and 108.

Next, the F transducer is hit by the compressional wave and switches flip-flop 76. Flip-flop 100 is inhibited and does not switch. The switching of flip-flop 76 applies a base bias signal to transistor 134 and turns it and lamp No. 1 on, thus indicating a one o'clock hit. The switching of flip-flop 76 also inhibits flip-flops 80, 82 and 84 so that signals from the other transducers will be ineffective to light any other lamps.

The flip-flops are reset by the operation of a switch 62 which connects the "P" leads of the flip-flops to ground, thus delivering a "zero" signal to reset the flip-flops.

TRANSDUCERS AND MOUNTINGS

FIGS. 4 and 5 show one of the transducers A through F, which preferably is a so-called "PZT" cell which converts the compression force it receives from the acoustic wave from a target impact into an electrical signal. The name "PZT" is an abbreviation for lead zirconate titanate. Such cells are well-known and are used, for example, in intermediate-frequency radio filters.

Each of the transducers 38 is mounted in the bottom of a cavity in a cup-shaped brass mounting member 42 which is fastened into a notch in the edge of a plate 24, as is illustrated in FIGS. 4 and 5. A solid brass rod 40 abuts against the cell 38 in order to provide a supporting mass so that the cell will be thoroughly distorted by the compressional wave and thus will produce a relatively large electrical output signal. The cell 38 and rod 40 are secured in the cup 42 by means of an adhesive material such as a conventional epoxy resin, which also insulates the rod from the mounting member 42. Electrical contact is made to one side of the cell by means of a lead 51 which is fastened to the end of the brass rod 40, and the other terminal of the cell is grounded by its contact with the plate 24. A leaf spring 41 is fastened to a supporting wall 47 of the target unit 20 by means of a pair of studs 45. The spring 41 thrusts against the rod 40 to insure that it makes good contact with the cell 38, and also acts as a shock absorber.

The guard plate 22 preferably is made of the same material and has the same thickness as the target plate 24, since it is likely to receive a substantial number of impacts from stray bullets. The plate 22 is deliberately made to overlap the transducer cells 38 and their mounting structure so as to protect them from stray bullets, and also to improve the accuracy of the scoring system, as has been explained above. An anelastic resilient rubber member 43 is used to attach the plate 22 to the target plate 24. Thus, the target plate 24 is suspended from the front plate 22 by a "lossy" element which effectively damps flexural oscillations of the target plate 24 after each hit.

The above description of the invention is intended to be illustrative and not limiting. Various changes or modifications in the embodiments described may occur to those skilled in the art and these can be made without departing from the spirit or scope of the invention.

I claim:

1. A target scoring device comprising a plurality of pairs of transducers positioned symmetrically around the target with the transducers in each pair being located substantially opposite one another, means for detecting the time difference between the first receipt of an impact-created acoustic wave by any of said transducers and the receipt of said acoustic wave by the other transducer of the pair including the transducer first receiving said wave, and means for indicating a score which is a function of said time difference.

2. A device as in claim 1 in which each of said transducers produces an electrical signal in response to the receipt by it of an acoustical compression wave.

3. A device as in claim 2 in which said target is a circular metal plate with said transducers being secured to the edge of said plate equidistant from the center of said plate, there being at least three of said pairs of said transducers.

4. A device as in claim 3 in which each of said transducers is a lead zirconate titanate cell.

5. A device as in claim 1 in which said detecting means includes a counter, and means for starting the counter with the signal from the first of said transducers to receive said wave, and stopping said counter with the signal from the last of said transducers to receive said wave.

6. A device as in claim 5 including a clock signal source, circuit means for connecting said clock signal source to said counter upon the receipt of a signal from any of said transducers, and for holding said connection and then releasing said connection upon receipt of a signal from the transducer located opposite to said first transducer.

7. A device as in claim 1 including a counter, a clock signal source whose clock frequency is proportional to the time required for said wave to travel from the center to the outer edge of said target, means for connecting said counter to said cock source upon first receipt of said wave by any said transducers, and for dis-connecting said source from said counter upon the last receipt of a wave by any of said transducers.

8. A target scoring device comprising a compressional acoustic wave-conductive target, a plurality of opposed pairs of transducers positioned symmetrically around the edges of said target and positioned to receive a compressional acoustic wave from a projectile hitting said target, means for detecting signals from said transducers, and measuring the time differential between the arrivals of such an acoustic wave at said transducers, and indicating the time differential between the first detection of a wave by one of said transducers and the detection of said wave by the opposite one of said transducers.

9. A method of detecting the approximate distance of an impact from a pre-determined point in a target area, said method comprising the steps of detecting the first time of arrival of the acoustic wave created by impact at one of a plurality of points arranged in opposed pairs and located equidistant from said pre-determined point, and detecting and indicating the elapsed time between said first arrival at said one point and the arrival of said wave at the opposite point.

10. A method as in Claim 9 including converting said tim difference into a score proportional to the distance of said impact from said point.

11. A system for locating an impact within a target area, said system comprising a plurality of acoustic wave detectors positioned uniformly around said target area, means for indicating which of said detectors first detects an acoustic wave from a target impact, means for indicating which of said detectors is second to detect said acoustic wave, and means for indicating an impact location between said first and second detectors.

12. A system as in claim 11 in which said detectors are located in a circular array and are arranged symmetrically with respect to a point on said target.

13. A device for indicating the approximate azimuth of an impact upon a target, said device comprising a plurality of transducers arranged in a circle, each transducer being located at a point between two adjacent azimuth points, there being one transducer for every other pair of azimuth points, means for detecting the first transducer to receive an acoustic wave from an impact on said target, means for detecting which of the transducers adjacent the first transducer next receives said wave, and means for identifying the azimuth point to the side of said first transducer which is towards the second transducer as the azimuth of the impact.

14. A device as in claim 13 in which said azimuth points correspond to the hour points on a clock face.

15. A device as in claim 14 including indicator devices at a remote location, there being one indicator device for each of said azimuth points.

16. A device as in claim 15 in which said target is a circular metal plate, and said transducers are lead zirconate titanate cells secured to the edge of said plate to receive compressional acoustic waves.

17. A device for scoring and locating an impact on a target, said device comprising means for detecting the maximum time interval between the arrivals of an impact-created acoustic wave at points located adjacent a target uniformly with respect to a point on the target and giving an indication proportional to said maximum time interval, and locating means for indicating to which of said adjacent points said impact is nearest, said detecting and indicating means including a plurality of transducers, one being located at each of said adjacent points, said adjacent points being arranged in a plurality of pairs of opposed transducers, said detecting means detecting the first and last receipts of said wave by said transducers.

18. A device as in claim 17 in which said locating means includes means for detecting which of said transducers is second to receive said wave, and means for for locating said impact as a function of the relative locations of said first and second transducers.

19. A device as in claim 1 including shield means covering said transducers and a portion of said target between said transducers and said point on said target.

20. A device as in claim 19 in which said target is a circular plate, said transducers are secured at the edge of said plate, and said shield has a central circular opening of a diameter substantially less than the diameter of said plate, said opening defining a target area on said plate.

21. A device as in claim 1 in which said target is made of a solid, acoustic wave-conductive material, and including anelastic mounting means for said target.

22. A device as in claim 21 in which said target is metal, and including a mounting plate with said anelastic mounting means fastening said target to said mounting plate adjacent the periphery of said target.

23. A device as in claim 11 in which said target area is on a target member which is made of a solid, acoustic wave-conductive material, and including anelastic mounting means for said target.

* * * * *